UNITED STATES PATENT OFFICE.

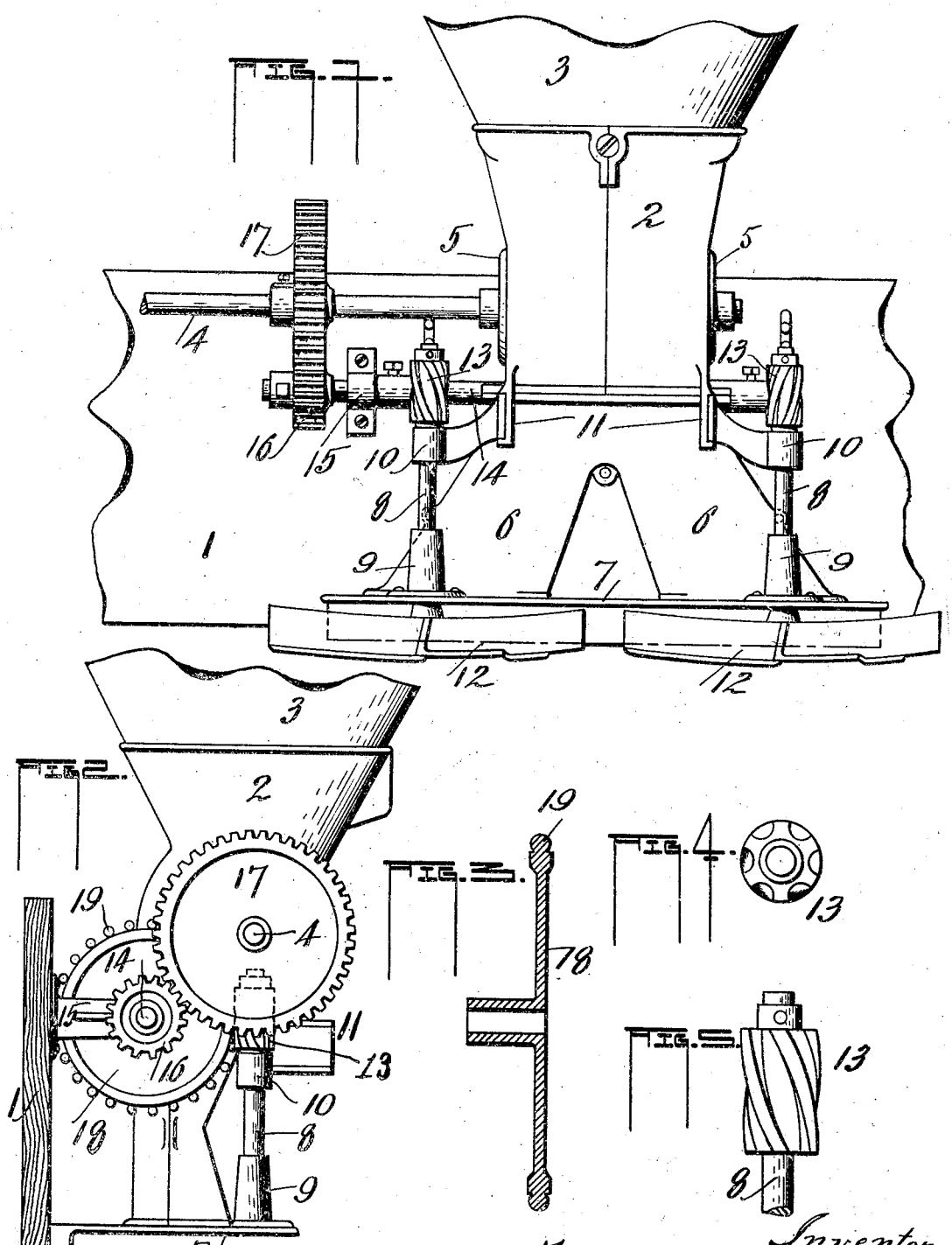

FERDINAND J. FELDT, OF PEORIA, ILLINOIS.

SEEDING-MACHINE.

No. 874,888.   Specification of Letters Patent.   Patented Dec. 24, 1907.

Application filed May 29, 1906. Serial No. 319,239.

*To all whom it may concern:*

Be it known that I, FERDINAND J. FELDT, a citizen of the United States, residing at Peoria, in the county of Peoria and State of Illinois, have invented certain new and useful Improvements in Seeding-Machines; and I do hereby declare that the following is a full, clear, and exact description of the invention, which will enable others skilled in the art to which it appertains to make and use the same.

This invention has reference to certain new and useful improvements in seeding machines, and relates particularly to the means employed for the transmsision of motion from a driving shaft adapted to operate suitable seeding devices within a hopper, and to distributers suitably disposed to receive material from the said hopper and to distribute the same broadcast over the ground.

The invention consists essentially of a hopper having one or more discharge spouts leading therefrom and supported from a suitable support, such as the end-gate of a wagon; a driving shaft adapted to operate suitable seeding devices within the hopper; one or more distributer shafts on which are carried distributing fans disposed beneath the said spout or spouts to receive material discharged therefrom; a counter-shaft extending parallel with the driving shaft; spur gears connecting the driving and counter-shafts; helical pinions carried on the upper ends of the distributing shafts; and gear wheels on the counter-shaft in mesh with said helical pinions; said last mentioned gear wheels having teeth unlike the teeth of the helical pinions, but provided with a series of radially projected teeth, more in the nature of the teeth of a spur gear, except that the teeth have rounded outer ends. The construction is such that the gears and pinions have more or less of a sliding motion as the teeth move into and out of mesh.

That the invention may be more fully understood reference is had to the accompanying drawings, in which:—

Figure 1 is a view from the rear in elevation of so much of a broadcast distributing machine as will illustrate my improvements which are attached thereto; Fig. 2 is a side elevation viewed from the left hand side of Fig. 1 with the distributer devices omitted; Fig. 3 is a vertical section enlarged through one of the gears on the counter-shaft which drives the helical pinion on the distributer shaft; Fig. 4 is a top plan view enlarged of one of the helical pinions, and Fig. 5 is an elevation of the gear shown in Fig. 4 and on the same scale.

Like numerals of reference indicate corresponding parts throughout the figures.

In the drawings I have shown my invention as applied to a double fan distributer, necessitating two distributing shafts and duplicate means on a driving shaft which coöperate therewith for actuating the said distributer. However, it is understood that the mechanism herein shown and described is equally as applicable to a single distributer seeding machine as it is to a double fan distributer.

In the drawings I have also illustrated a preferred form of distributer, yet it is to be understood that the devices which I claim as my improvement may be applied to other forms of machine than that here shown.

In the drawings 1 denotes a support for the seeding devices consisting of an end-gate, which is of the usual type adapted to have a detachable connection with the rear of a suitable vehicle.

2 refers to a hopper support in which is adapted to be carried suitable seeding devices (not shown) which may be of the usual force feed type or other suitable feeding means, and 3 denotes a hopper extending up from and supported by the said hopper support. The feeding devices to which reference has been made, but not shown, are adapted to be actuated by a transverse driving shaft 4 which passes through the hopper support 2 and is journaled in the bearing plates 5 attached thereto. The driving shaft 4 is adapted, when attaching the seeding devices to the vehicle, to be driven through suitable connection with one of the ground wheels of the vehicle, or the same may be driven in any other desirable or convenient manner.

Depending and diverging from the hopper support 2 and connecting with the feeding devices therein, are the feed spouts 6 which at their lower ends are connected and supported upon a plate or shield 7, through which may be provided suitable openings, not shown, to adapt any material discharged through the spouts 6 on to the fan distributers to be described..

8 denotes, preferably, a pair of vertically disposed distributer shafts 8, the lower ends of which pass through the shield, 7 and are journaled in the bearings 9 supported by the said shield. The upper ends of the said shafts 8 pass through the bearings 10 which project laterally from and are supported by the arms 11 which extend outwardly from the lower opposite sides of the hopper support 2. On the lower ends of the shafts beneath the shield are carried the fan distributers 12 which are so disposed beneath the shield as to receive any material which may be discharged through the shield from the spouts 6, while on the extreme upper ends of the said shafts are carried the helical pinions 13.

14 denotes a transversely disposed counter-shaft, which may be carried at the rear of or through the hopper support, which will serve as a bearing therefor, and the shaft is also journaled in a bracket 15 attached to and projecting from the support or end-gate 1.

16 is a spur pinion carried by the drive shaft 14 which is continuously in mesh with a spur gear 17 carried on the driving shaft 4, through and by means of which the power which is transmitted to the shaft 4 will be imparted to the counter-shaft 14.

Carried by the counter-shaft 14 is a pair of gears 18 which are adapted to intermesh with and drive the helical pinions 13, provided with teeth 19 extending radially from the peripheral face of the gear and rounded on their outer ends to adapt the said teeth to have constant and perfect contact with the helical teeth of said pinions 13. In the drawings the teeth of the gears 18 are shown as ball-teeth, suitably spaced apart and projecting radially from the gears.

The advantages of the helical pinions and form of gears on the counter-shaft in mesh therewith as applied to broadcast seeding machines are numerous. The use of such gearing maintains a uniform driving contact at all times, and as the pinions are advanced the degree of a tooth, it will leave off where the next tooth begins, thus presenting an approximately unbroken surface, which insures more than one tooth being in mesh at all times and with the teeth of the gear and pinion sliding into and out of mesh.

The application of gearing of the character described for transmitting motion from a driving shaft of a seeding machine to the fan distributers thereof, provides a drive which is practically noiseless and simplifies the construction and arrangement of such parts; accomplishing all that is claimed for a friction drive without slipping and avoiding the use of all springs, also by their use is obviated the use of means for yieldingly holding the gears in contact, such as a spring for relieving the strain on the teeth when the ordinary bevel gearing is thrown into mesh, which are used on a similar type of machine.

Having thus fully described my invention, what I claim and desire to secure by Letters Patent of the United States, is:—

In a device of the class described, a supporting member, a combined shield and bracket extending laterally from said supporting member, a hopper support having a hopper extending from one end and feed spouts depending from the other end and connected to said shield and bracket, a drive shaft and a counter shaft journaled through said hopper support, arms extending from said support, hangers connected to said arms and provided with vertical shaft bearings in their free ends, shaft bearings carried by said shield and bracket in vertical alinement with the bearings of said hangers, vertical shafts carried by said shield and bracket bearings and by said hanger bearings, distributer devices carried by the lower ends of said vertical shafts and operating beneath said combined shield and bracket, pinions having obliquely disposed spaced teeth, gears carried by said counter shaft and provided with spaced semi-spherical peripheral teeth adapted to engage the oblique teeth of said pinions, and means for transmitting the motion from said drive shaft to said counter shaft.

In testimony whereof I affix my signature, in presence of two witnesses.

FERDINAND J. FELDT.

Witnesses:
  CHAS. W. LA PORTE,
  ROBERT N. MCCORMICK.